United States Patent [19]

Rathman et al.

[11] Patent Number: 5,730,952
[45] Date of Patent: Mar. 24, 1998

[54] PROCESS FOR THE PREPARATION OF LITHIUM ALUMINUM HYDRIDE IN ETHERAL SOLVENTS

[75] Inventors: Terry Lee Rathman, Gastonia; James Anthony Schwindeman, Lincolnton; Eric John Granger, Charlotte; Sharon Bergmann Smith, Gastonia, all of N.C.

[73] Assignee: FMC Corporation, Philadelphia, Pa.

[21] Appl. No.: 600,356

[22] Filed: Feb. 12, 1996

[51] Int. Cl.$^6$ .................................................. C01B 6/24
[52] U.S. Cl. .................................................. 423/644
[58] Field of Search ...................................... 423/644

[56] References Cited

U.S. PATENT DOCUMENTS

| | | | |
|---|---|---|---|
| 3,162,508 | 12/1964 | Bragdon et al. | 423/644 |
| 3,180,700 | 4/1965 | Robinson | 23/14 |
| 3,207,570 | 9/1965 | Nöth | 423/644 |
| 3,337,308 | 8/1967 | Verdieck et al. | 23/365 |
| 3,353,930 | 11/1967 | Clasen et al. | 423/644 |
| 3,387,947 | 6/1968 | Grendel | 23/365 |

FOREIGN PATENT DOCUMENTS

| | | | |
|---|---|---|---|
| 595782 | 4/1960 | Canada | 423/644 |
| 1808078 | 11/1968 | Germany. | |
| 830717 | 3/1960 | United Kingdom | 423/644 |
| 905985 | 9/1962 | United Kingdom | 423/644 |

OTHER PUBLICATIONS

Direct Synthesis of Comlpex Metal Hydrides, E.C. Ashby, et al., Inorganic Chemistry, vol. 2, No. 3, Jun. 1963.

*Primary Examiner*—Wayne Langel
*Attorney, Agent, or Firm*—Bell Seltzer Intellectual Property Law Group of Alston & Bird LLP

[57] ABSTRACT

A process for the preparation of lithium aluminum hydride in an ethereal solvent via the metathesis of sodium aluminum hydride and lithium chloride in a one direct step reaction comprising heating together sodium aluminum hydride and lithium chloride in an ethereal solvent at a temperature of 25° C. to the reflux temperature of the solvent until the reaction is complete.

5 Claims, No Drawings

PROCESS FOR THE PREPARATION OF LITHIUM ALUMINUM HYDRIDE IN ETHEREAL SOLVENTS

This application is a continuation-in-part of a provisional application Ser. No.: 60/002,058 filed on Aug. 9, 1995.

This invention concerns a process for the preparation of lithium aluminum hydride in ethereal solvents by metathesis of sodium aluminum hydride with lithium chloride.

Lithium aluminum hydride ($LiAlH_4$) is a powerful reducing agent, soluble in organic solvents. This reagent has found wide utility in organic synthesis, due to its reducing power. A wide variety of functional groups are reduced with this reagent, including aldehydes, ketones, esters, amides, epoxides, and nitriles.

A common synthetic method for the commercial preparation of lithium aluminum hydride involves the metathesis of sodium aluminum hydride ($NaAlH_4$) with lithium chloride to form lithium aluminum hydride and sodium chloride (equation 1).

$$NaAlH_4 + LiCl \rightarrow LiAlH_4 + NaCl \quad (1)$$

There are two common procedures for preparing lithium aluminum hydride in an inert organic solvent, such as diethyl ether or tetrahydrofuran, via metathesis. The first method involves preparing a solution of sodium aluminum hydride in the desired solvent system first, before carrying out the metathesis reaction. This procedure involves a separate reactor and reaction step, slow filtration, and analysis prior to using the sodium aluminum hydride solution in the metathesis reaction. The metathesis reaction is then typically run with an appreciable amount of toluene as a co-solvent and a few mole percent of lithium aluminum hydride to catalyze the reaction. The second method typically involves a one step process in which sodium aluminum hydride and lithium chloride are reacted together in one reactor along with toluene as a co-solvent and a few mole percent of lithium aluminum hydride to catalyze the reaction. At the conclusion of the metathesis reaction, the reaction mixture is filtered to remove the sodium chloride by-product.

The present invention overcomes these difficulties. In accordance with the present invention, lithium aluminum hydride can be prepared via metathesis in one step in an ethereal solvent such as tetrahydrofuran without any co-solvent, catalyst, or prior preparation of sodium aluminum hydride in solution. Solid sodium aluminum hydride is added to lithium chloride which is generally present in a slight excess, for example, 1.1 equivalents, based on the sodium aluminum hydride, in an ethereal solvent at room temperature. The reaction is heated to a temperature between 25° C. to the reflux temperature of the solvent until the reaction is complete, about six hours at the reflux temperature of tetrahydrofuran, cooled, and filtered to remove excess lithium chloride and sodium chloride by-product. The filter cake is optionally washed with the ethereal solvent to recover any entrained lithium aluminum hydride product. This procedure affords a solution of lithium aluminum hydride in the ethereal solvent in a high yield.

Solvents useful in the practice of this invention include but are not limited to the ethereal solvents selected from the group consisting of tetrahydrofuran, t-butyl methyl ether, 2-methyl-tetrahydrofuran, 1,2-dimethoxyethane, diethoxymethane, and mixtures thereof.

The amount of lithium chloride can be varied from 0.9 equivalents to up to 5.0 equivalents, based on the sodium aluminum hydride charged.

The process is conducted in an inert atmosphere, preferably under a noble gas atmosphere, most preferably under argon. The temperature can vary between 25° C. and the reflux temperature of the solvent. The amount of time required to complete the reaction varies with the temperature and with the solvent selected. When using tetrahydrofuran at its reflux temperature about 6 hours is generally sufficient to complete the reaction.

The following examples further illustrate the invention. Unless noted otherwise, all temperatures are in degrees Centigrade, all reactions were conducted in an inert argon atmosphere and weights are in grams.

EXAMPLE 1

Preparation of Lithium Aluminum Hydride in Tetrahydrofuran: Sodium Aluminum Hydride Addition to Lithium Chloride/Tetrahydrofuran, lot 9807.

A 2 liter, 3-neck round bottom flask was equipped with a mechanical stirrer and a Claisen adapter with a teflon coated temperature probe and a dry ice condenser. This apparatus was dried in an oven at 125° C. overnight, assembled hot, and allowed to cool to room temperature in a stream of argon. Lithium chloride (46.8 g, 1.1 mole, 1.1 equivalent) was weighed out into the flask in a glove box. Tetrahydrofuran (750 ml) was added. The slurry was stirred at room temperature (20°–25° C.) for 145 min. Sodium aluminum hydride (62.4 g, 1.0 mole, 1.0 equivalent, Albemarle, 86.5%) was weighed out into a separate flask in a glove box, then added to the reaction flask via a transfer tube over 10 min. The flask was rinsed with tetrahydrofuran (250 ml). The reaction mixture was heated to reflux (67°–68° C.) for 6 hours, then cooled to room temperature with stirring overnight. The reaction was transferred to a 1 liter sintered glass pressure filter (medium frit). The product solution was filtered with 3–4 psi argon pressure. In two hours, 737.3 grams (840 ml) of filtrate was collected. The filtrate was a clear, colorless solution and contained no visible solids.

Analysis (ICP): Li, 0.846%; Al, 2.75%; Na, 0.010%; density 0.906 g/ml. Yield (based on Li)=74.8%.

EXAMPLE 2

Preparation of Lithium Aluminum Hydride in Tetrahydrofuran: Sodium Aluminum Hydride Addition to Lithium Chloride/Tetrahydrofuran, lot 9869.

A 2 liter, 3-neck round bottom flask was equipped with a mechanical stirrer and a Claisen adapter with a teflon coated temperature probe and a dry ice condenser. This apparatus was dried in an oven at 125° C. overnight, assembled hot, and cooled to room temperature in a stream of argon. Lithium chloride (93.8 g, 2.2 mole, 1.1 equivalent) was weighed out into the flask in a glove box. Tetrahydrofuran (750 ml) was added. The slurry was stirred at room temperature (20°–25° C.) for 45 min. Sodium aluminum hydride (120.5 g, 2.0 mole, 1 equivalent, Aldrich, 90%) was weighed out into a separate flask in a glove box, then added to the reaction flask via a transfer tube. The flask was rinsed with tetrahydrofuran (250 ml). The reaction mixture was heated to reflux (67°–68° C.) for 6 hours, then cooled to room temperature with stirring overnight. Then reaction was transferred to a 1 liter sintered glass pressure filter (coarse frit). The product solution was filtered with 3–4 psi argon pressure. The reaction flask and filter muds were washed with fresh tetrahydrofuran (150 ml), added to filtrate. In two hours, 871.31 g (990 ml) of filtrate was collected. The filtrate was a slightly hazy solution, but contained no visible solids.

Analysis (ICP): Li, 1.45%; Al, 5.55%; Na, 0.001%; density 0.905 g/ml. Yield (based on Li)=89.6%.

We claim:

1. A process for the preparation of lithium aluminum hydride in an ethereal solvent via the metathesis of sodium aluminum hydride and lithium chloride in a one direct step reaction without a prior sodium aluminum hydride solution forming step and without a cosolvent or a catalyst comprising adding sodium aluminum hydride without a sodium aluminum hydride solution forming step to lithium chloride and an ethereal solvent and heating together said sodium aluminum hydride and lithium chloride in said ethereal solvent at a temperature of 25° C. to the reflux temperature of the solvent, under an inert atmosphere, until the reaction is complete.

2. The process of claim 1, wherein the ethereal solvent is selected from the group consisting of tetrahydrofuran, t-butyl methyl ether, methyl tetrahydrofuran, 1,2-dimethoxyethane, diethoxymethane, and mixtures thereof.

3. The process of claim 1, wherein the ethereal solvent is tetrahydrofuran.

4. The process of claim 1, wherein the ratio of lithium chloride to sodium aluminum hydride is between 0.9 and 5.0.

5. The process of claim 1, wherein the product is recovered from excess lithium chloride and sodium chloride by-product by filtration or centrifugation.

* * * * *